United States Patent
Bleier

(10) Patent No.: US 8,827,468 B2
(45) Date of Patent: Sep. 9, 2014

(54) MOUNT FOR AN OPTICAL STRUCTURE AND METHODS OF MOUNTING AN OPTICAL STRUCTURE USING SUCH MOUNT

(71) Applicant: Zvi Bleier, Lloyd Harbor, NY (US)

(72) Inventor: Zvi Bleier, Lloyd Harbor, NY (US)

(73) Assignee: PLX, Inc., Deer Park, NY (US)

( * ) Notice: Subject to any disclaimer, the term of this patent is extended or adjusted under 35 U.S.C. 154(b) by 0 days.

(21) Appl. No.: 13/965,333

(22) Filed: Aug. 13, 2013

(65) Prior Publication Data

US 2013/0326862 A1    Dec. 12, 2013

Related U.S. Application Data

(62) Division of application No. 13/208,887, filed on Aug. 12, 2011, now Pat. No. 8,567,968, which is a division of application No. 11/674,315, filed on Feb. 13, 2007, now Pat. No. 8,092,030.

(60) Provisional application No. 60/791,564, filed on Apr. 12, 2006.

(51) Int. Cl.
*G02B 5/08* (2006.01)
*G02B 7/182* (2006.01)
*G02B 7/18* (2006.01)

(52) U.S. Cl.
CPC .............. *G02B 7/182* (2013.01); *G02B 7/1805* (2013.01); *Y10S 359/90* (2013.01)
USPC ........... 359/850; 359/856; 359/857; 359/871; 359/900

(58) Field of Classification Search
USPC .......................... 359/850, 856, 857, 871, 900
See application file for complete search history.

(56) References Cited

U.S. PATENT DOCUMENTS

| | | |
|---|---|---|
| 2,626,771 A | 1/1953 | Krohm |
| 3,310,264 A | 3/1967 | Appleton |

(Continued)

FOREIGN PATENT DOCUMENTS

| | | |
|---|---|---|
| WO | 2007120476 A2 | 10/2007 |
| WO | 2013078281 A2 | 5/2013 |

OTHER PUBLICATIONS

Office Action of U.S. Appl. No. 13/777,267, dated Sep. 13, 2013.

(Continued)

*Primary Examiner* — Ricky D Shafer
(74) *Attorney, Agent, or Firm* — Pergament Gilman & Cepeda LLP

(57) ABSTRACT

An improved mount for, and methods of mounting an, optical structure are provided. The mount has a protruding member extending from a surface of the optical structure, a base element having a mounting structure for mounting the mount to another structure and an upper element extending from the base element having a first opening extending therethrough for receipt therein of at least a portion of the protruding member. The first opening defines first and second arms, each of the arms comprising a head portion and each of the head portions ending at an end. A second opening in the upper element extends through one of the head portions and the end thereof in a direction toward the other head portion, while a third opening exists in the upper element through the end of the other head portion in an orientation substantially opposite to and in communication with the second opening so that a tightening mechanism received through the second opening can be received into the third opening. Tightening of the tightening mechanism into the third opening causes the ends of the head portions to draw toward each other so that the first opening of the upper element tightens around the at least a portion of the protruding member.

20 Claims, 5 Drawing Sheets

(56) References Cited

U.S. PATENT DOCUMENTS

| | | |
|---|---|---|
| 3,526,381 A | 9/1970 | Pepe |
| 3,663,084 A | 5/1972 | Lipkins |
| 3,667,718 A | 6/1972 | Goslin et al. |
| 3,832,072 A | 8/1974 | Mazur |
| 3,977,765 A | 8/1976 | Lipkins |
| 4,025,792 A | 5/1977 | Harries |
| 4,193,693 A | 3/1980 | Schindler et al. |
| 4,383,205 A | 5/1983 | Guisinger |
| 4,383,762 A | 5/1983 | Burkert |
| 4,479,625 A | 10/1984 | Martz |
| 4,556,316 A | 12/1985 | Doyle |
| 4,635,887 A | 1/1987 | Hall et al. |
| 4,710,001 A | 12/1987 | Lacey |
| 4,773,757 A | 9/1988 | Doyle |
| 4,810,092 A | 3/1989 | Auth |
| 4,815,836 A | 3/1989 | Byers et al. |
| 4,914,297 A | 4/1990 | Wieboldt et al. |
| 4,915,502 A | 4/1990 | Brierley |
| 4,918,306 A | 4/1990 | Saito |
| 4,991,961 A | 2/1991 | Strait |
| 5,002,394 A | 3/1991 | Auth |
| 5,122,901 A | 6/1992 | Bleier |
| 5,196,902 A | 3/1993 | Solomon |
| 5,239,361 A | 8/1993 | Burch |
| 5,335,111 A | 8/1994 | Bleier |
| 5,349,438 A | 9/1994 | Solomon |
| 5,440,143 A | 8/1995 | Carangelo et al. |
| 5,486,917 A | 1/1996 | Carangelo et al. |
| 5,521,698 A | 5/1996 | Carroll et al. |
| 5,543,916 A | 8/1996 | Kachanov |
| 5,610,706 A | 3/1997 | Carroll et al. |
| 5,678,409 A | 10/1997 | Price |
| 5,808,739 A | 9/1998 | Turner et al. |
| 5,861,956 A | 1/1999 | Bridges et al. |
| 5,949,543 A | 9/1999 | Bleier et al. |
| 5,949,544 A | 9/1999 | Manning |
| 6,062,697 A | 5/2000 | Bryant et al. |
| 6,141,101 A | 10/2000 | Bleier et al. |
| 6,246,052 B1 | 6/2001 | Cleveland et al. |
| 6,302,585 B1 | 10/2001 | Lee et al. |
| 6,402,330 B1 | 6/2002 | Scheidegg |
| 6,453,566 B1 | 9/2002 | Bottinelli et al. |
| 6,473,185 B2 | 10/2002 | Vishnia et al. |
| 6,639,742 B2 | 10/2003 | Snively et al. |
| 6,657,196 B2 | 12/2003 | Endo et al. |
| 6,729,735 B2 | 5/2004 | Bleier |
| 6,752,503 B2 | 6/2004 | Bleier |
| 6,786,608 B1 | 9/2004 | Bleier |
| 6,827,455 B2 | 12/2004 | Bleier |
| 6,836,968 B1 | 1/2005 | Walker et al. |
| 6,940,598 B2 | 9/2005 | Christel et al. |
| 6,945,661 B2 | 9/2005 | Bleier |
| 7,116,871 B2 | 10/2006 | Sullivan et al. |
| 7,168,817 B2 | 1/2007 | Bleier et al. |
| 7,224,464 B2 | 5/2007 | Manning |
| 7,265,369 B2 | 9/2007 | Maruo |
| 7,268,960 B2 | 9/2007 | Vishnia |
| 7,275,332 B2 | 10/2007 | Blanding |
| 7,355,697 B2 | 4/2008 | Mertz et al. |
| 7,535,572 B2 | 5/2009 | Englert |
| 7,623,234 B2 | 11/2009 | Puzey |
| 7,630,081 B2 | 12/2009 | Ressler et al. |
| 7,835,077 B2 | 11/2010 | Rosenqvist |
| 7,894,055 B2 | 2/2011 | Mertz et al. |
| 7,894,057 B2 | 2/2011 | Puzey |
| 7,995,208 B2 | 8/2011 | Jacobson et al. |
| 8,092,030 B2 | 1/2012 | Bleier |
| 8,120,853 B2 | 2/2012 | Jacobson et al. |
| 8,205,852 B2 | 6/2012 | Jacobson et al. |
| 8,205,853 B2 | 6/2012 | Jacobson et al. |
| 8,454,176 B2 | 6/2013 | Bleier |
| 8,567,968 B2 | 10/2013 | Bleier |
| 2003/0007155 A1 | 1/2003 | Ota |
| 2003/0048533 A1 | 3/2003 | Lyons, III |
| 2005/0008298 A1 | 1/2005 | Sullivan et al. |
| 2005/0094155 A1 | 5/2005 | Hill et al. |
| 2007/0295155 A1 | 12/2007 | Bleier |
| 2008/0170231 A1 | 7/2008 | Ressler et al. |
| 2010/0012808 A1 | 1/2010 | Jacobson et al. |
| 2010/0033728 A1 | 2/2010 | Jacobson et al. |
| 2011/0273778 A1 | 11/2011 | Jacobson et al. |
| 2011/0308060 A1 | 12/2011 | Bleier |
| 2011/0310504 A1 | 12/2011 | Bleier |
| 2012/0091310 A1 | 4/2012 | Jacobson et al. |
| 2012/0113522 A1 | 5/2012 | Jacobson et al. |
| 2012/0218654 A1 | 8/2012 | Bleier et al. |
| 2013/0135026 A1 | 5/2013 | Bleier et al. |
| 2013/0135622 A1 | 5/2013 | Bleier et al. |
| 2013/0138226 A1 | 5/2013 | Bleier et al. |
| 2013/0167353 A1 | 7/2013 | Bleier |
| 2014/0029009 A1 | 1/2014 | Bleier et al. |
| 2014/0029010 A1 | 1/2014 | Bleier et al. |

OTHER PUBLICATIONS

International Search Report and Written Opinion for PCT/US07/08103, dated Jul. 14, 2008.
Office Action of U.S. Appl. No. 11/674,315, dated Sep. 19, 2008.
Office Action of U.S. Appl. No. 11/674,315, dated Apr. 27, 2011.
Ex parte Quayle Communication of U.S. Appl. No. 11/674,315, dated Jul. 21, 2011.
Office Action of U.S. Appl. No. 13/211,507, dated Nov. 27, 2012.
Office Action of U.S. Appl. No. 13/208,887, dated Nov. 7, 2012.
Ex parte Quayle Communication of U.S. Appl. No. 13/208,887, dated Jul. 11, 2013.
Office Action for U.S. Appl. No. 13/777,267, dated Jan. 15, 2014.
Interview Summary for U.S. Appl. No. 13/777,267, dated Apr. 28, 2014.
Advisory Action for U.S. Appl. No. 13/777,267, dated Apr. 2, 2014.
Smith, S.T., Ultraprecision Mechanism Design, Chap. 4, "Flexure Design for Positioning and Control", pp. 95-112.
Vehar, Christine, "Flexure Design for Precision and Control", http://www.engin.umich.edu/labs/csdl/ppslides/FlexureDesignForPrecisionAndControl_files/v3_document.html (Mar. 18, 2004).
International Search Report and Written Opinion, dated Mar. 27, 2013, for International Application No. PCT/US12/66219, filed; Nov. 21, 2012.
Notice of Allowance for U.S. Appl. No. 12/537,028, dated Apr. 1, 2011.
Ex parte Quayle Communication for U.S. Appl. No. 12/505,279, dated Nov. 14, 2011.
Notice of Allowance for U.S. Appl. No. 13/180,922, dated Dec. 30, 2011.
Notice of Allowance for U.S. Appl. No. 12/505,279, dated Feb. 16, 2012.
Notice of Allowance for U.S. Appl. No. 138/324,459, dated May 4, 2012.
Office Action for U.S. Appl. No. 13/560,583, dated May 10, 2103.
Interview Summary for U.S. Appl. No. 13/560,583, dated May 29, 2013.
Office Action for U.S. Appl. No. 13/560,583, dated Oct. 22, 2013.
Office Action for U.S. Appl. No. 13/560,583, dated Mar. 19, 2014.

MOUNT FOR AN OPTICAL STRUCTURE AND METHODS OF MOUNTING AN OPTICAL STRUCTURE USING SUCH MOUNT

CROSS-REFERENCE TO RELATED APPLICATIONS

This application is a Divisional application of U.S. patent application Ser. No. 13/208,887, filed on Aug. 12, 2011, which has issued as U.S. Pat. No. 8,567,968 on Oct. 29, 2013, and which is a Divisional application of U.S. patent application Ser. No. 11/674,315, filed Feb. 13, 2007, which has issued as U.S. Pat. No. 8,092,030 on Jan. 10, 2012, and which claims priority to, and the benefit of, U.S. Provisional Patent Application Ser. No. 60/791,564, filed Apr. 12, 2006, the entireties of which applications and patents are incorporated herein by reference.

BACKGROUND OF THE INVENTION

This invention relates to the field of mounts for optical structures, including but not limited to, reflective panels, hollow retroreflectors and solid retroreflectors.

Optical structures such as, but not limited to, reflective panels (mirror panels), hollow retroreflectors and solid retroreflectors are old in the art. Solid retroreflectors are solid cubes of glass wherein adjacent sides of the cube are substantially perpendicular to each other and three of the sides that meet at a common corner are polished to have a high degree of flatness. Hollow retroreflectors are made of three mirror panels joined together preferably having optically flat reflective surfaces disposed at right angles to each other, and meeting at what can be described as a common inside corner of an imaginary cube. Both solid and hollow retroreflectors in general have the essential property of causing incident and reflected light rays to travel along substantially parallel paths.

When hollow retroreflectors are assembled for high accuracy and precision it is important to maintain the mutual perpendicularity of the reflective surfaces and sometimes essential to ensure that the retroreflector as a whole does not move. The perpendicularity of the reflective surfaces is affected by external stresses. With regard to high accuracy and precise reflective panels, such as mirror panels to be used for high accuracy purposes, it is also important to try and maintain as optically flat as possible the reflective surface of the panel.

Examples of external stresses that can affect the optical flatness of a reflective panel and/or the perpendicularity of reflective surfaces of abutting reflective panels of a hollow retroreflector, are thermal expansion or contraction of the substrate material from which the panels are made, deflection caused by curing of the adhesives used to join elements together and/or to join the retroreflector to its mount and/or the mass of the panels themselves. Accordingly, it would be desirable to assemble together the elements of a hollow retroreflector and/or to assemble a reflective panel to a mount, in such a manner as to reduce these stresses. It would also be desirable that the manner of mounting a retroreflector to its mount not add to these stresses, but nevertheless, securely retain the retroreflector on the mount. Examples of hollow retroreflector mounts which have proven successful in maintaining the reflective surfaces in their perpendicular orientations are found in U.S. Pat. No. 3,977,765, to Morton S. Lipkins, U.S. Pat. No. 5,122,901, to Zvi Bleier, and U.S. Pat. No. 5,335,111, also to Bleier.

The present mount also achieves secure mounting of the optical structure in a manner designed to help eliminate deflective stresses on the reflective surface(s) of the structure caused by the mounting of the retroreflector to its mount.

The mount also allows for easy and secure mounting of the optical structure onto a support structure.

SUMMARY OF THE INVENTION

In accordance with the invention, an improved mount for, and methods of mounting an optical structure are provided. The mount has a protruding member extending from a surface of the optical structure, a base element having a mounting structure for mounting the mount to another structure and an upper element extending from the base element having a first opening extending therethrough for receipt therein of at least a portion of the protruding member. The first opening defines first and second arms, each of the arms comprising a head portion and each of the head portions ending at an end. A second opening in the upper element extends through one of the head portions and the end thereof in a direction toward the other head portion, while a third opening exists in the upper element through the end of the other head portion in an orientation substantially opposite to and in communication with the second opening so that a tightening mechanism received through the second opening can be received into the third opening. Tightening of the tightening mechanism into the third opening causes the ends of the head portions to draw toward each other so that the first opening of the upper element tightens around the at least a portion of the protruding member.

The method of mounting the optical structure onto the mount is to form an optical structure having a reflective surface and a portion of the mount comprising a protruding member extending from a back surface of the optical structure, wherein the protruding member is either integrally formed with, or bonded to, the back surface of the optical structure. Forming the remainder of the mount comprising a base element having a construction for allowing the mount to be mounted to another structure, the mount further having an upper element having a first opening extending therethrough, such first opening forming two arms each having a head portion and ending at ends thereof. Sliding the first opening of the mount over at least a portion of the protruding member. Tightening the first opening of the mount around the protruding member by inserting a tightening mechanism into a second opening located through one of the head portions of the mount and by further inserting and tightening the tightening member into a third opening in the other head portion of the mount so that the tightening member draws the two ends of the head portions toward each other thereby contracting the first opening of the mount around the protruding member of the optical structure.

Accordingly, it is an object of the invention to provide an improved mount for an optical structure.

Another object of the invention is to provide an improved mount for an optical structure which causes minimal external stresses to the reflective surfaces of the optical structure.

Still another object of the invention is to provide an improved mount for an optical structure wherein the mount achieves reductions in movement of the optical structure in order to achieve higher-accuracy distance measurements.

Yet a further object of the invention is to provide an improved mount for an optical structure wherein the mounting of the mount and optical structure to a support structure is easy and secure.

It is even a further object of the invention to provide an improved method of mounting an optical structure using the improved mount.

Other objects of the invention will in part be obvious and will in part be apparent from the following description.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

Figure 5:
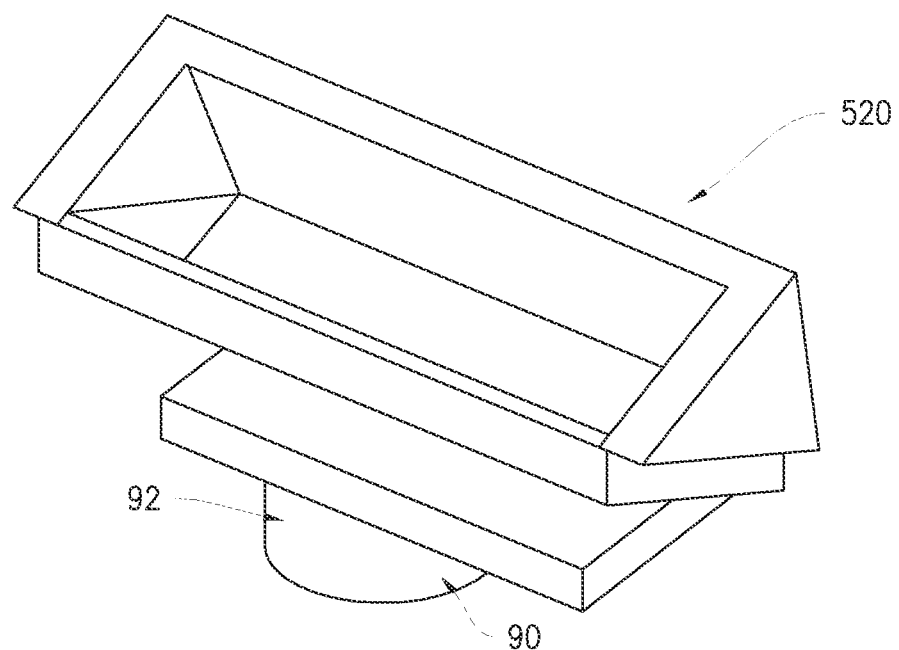
FIG. 5 is a perspective view of a roof mirror having a pin extending therefrom in accordance with one or more aspects of the instant application.

Referring to the figures, a mount for an optical structure made in accordance with the invention is generally designated at 10. In the particular case of the figures of this application, the optical structure portrayed is that of a hollow retroreflector, which will hereinafter generally be designated in the figures at 20. It is of course to be understood that other optical structures are anticipated to be compatibly used with mount 10, including but not limited to, individual mirror panels (not shown) and/or roof mirrors (see e.g., roof mirror 520 having a protruding member 90 with an outer surface 92 of FIG. 5) and/or solid retroreflectors (not shown).

Retroreflector 20 is preferably made of fused quartz or fine annealed Pyrex (i.e., any type of borosilicate glass or glasses having a low coefficient of thermal expansion), while mount 10 is preferably made of a metal alloy having a very low coefficient of thermal expansion, such as INVAR (e.g., a nickel iron alloy having a low coefficient of thermal expansion) or aluminum.

Hollow retroreflector 20 is comprised of a first panel 30, a second panel 40, and a third panel 50. Each of the panels 30, 40 and 50 has a corresponding reflective surface 32, 42 and 52. The higher the degree of optical flatness achieved in surfaces 32, 42 and 52 will in part determine the accuracy of the corresponding panels 30, 40 and 50. Panels 30, 40 and 50 are disposed substantially at right angles to each other so that reflective surfaces 32, 42 and 52 are also disposed substantially at right angles to each other. Each of panels 30, 40 and 50 also has non-reflective, back surfaces 34, 44 and 54 which are opposite to reflective surfaces 32, 42 and 52.

As with all hollow retroreflectors, retroreflector 20 is designed to receive an incoming (incident) light ray (not shown) and reflect the light ray off of the reflective surfaces 32, 42 and 52 and out from retroreflector 20 along a path substantially parallel to the incident light ray. Of course, the incident light ray can initially strike any one of the reflective surfaces without bearing upon the accuracy of the parallelism of the reflected light ray. The accuracy tolerances for retroreflector 20 will almost always depend upon the function to be performed by retroreflector 20. If high degrees of accuracy; i.e., parallelism of the incident and reflected light rays, is a primary purpose of retroreflector 20, then high degrees of precision must be created and maintained with respect to the flatness of and perpendicularity of reflective surfaces 32, 42 and 52.

One construction for a hollow retroreflector is as disclosed in U.S. Pat. No. 3,663,084 to Morton S. Lipkins. If the construction shown in the '084 patent is used herein, then each of panels 30, 40 and 50 of hollow retroreflector 20 has at least first and second sides 36 and 38, 46 and 48 and 56 and 58, respectively. The first and second sides of each of the panels are substantially perpendicular to each other and to each of the other sides of the other panels. As is seen in the figures, second side 48 of panel 40 is abutted against and adhered to reflective surface 32 of panel 30, second side 38 of panel 30 is abutted against and adhered to reflective surface 52 of panel 50, and second side 58 of panel 50 is abutted against and adhered to reflective surface 42 of panel 40. Accordingly, each of panels 30, 40 and 50 is simultaneously an abutting panel at second sides 38, 48 and 58, and an adjacent panel at first sides 36, 46 and 56.

Turning now to a discussion of mount 10, it is seen from the figures that mount 10 has an upper element 60 and a base element 100.

Figure 4A:
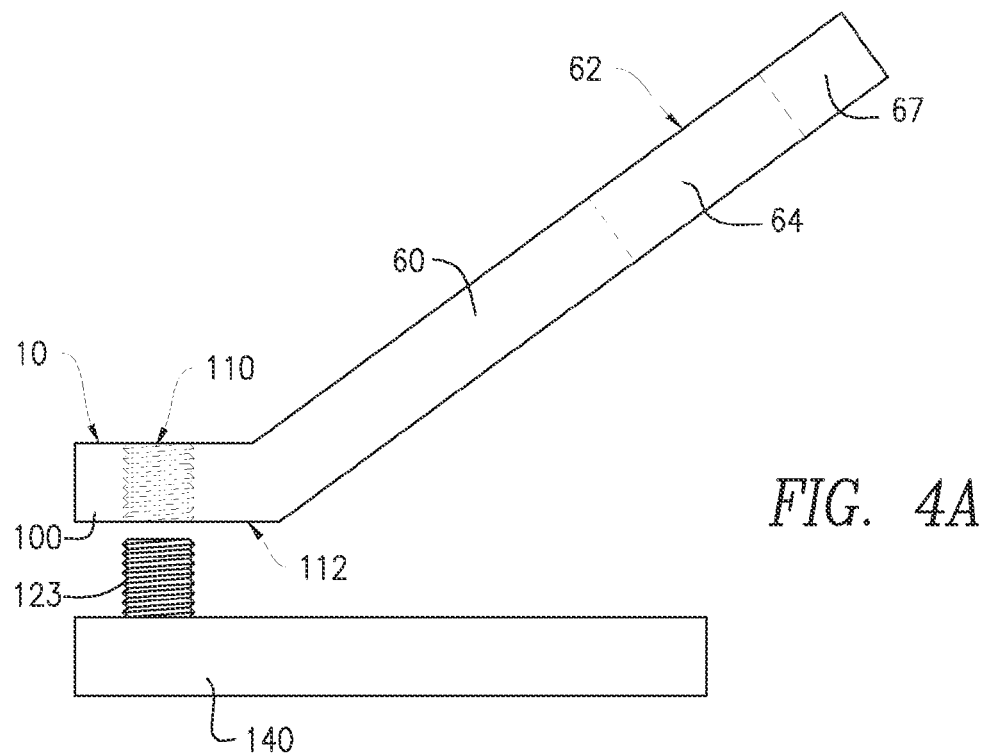
FIG. 4A is a side view of the mount 10 of FIG. 1 along with another structure having a threaded member extending therefrom.
Figure 4B:
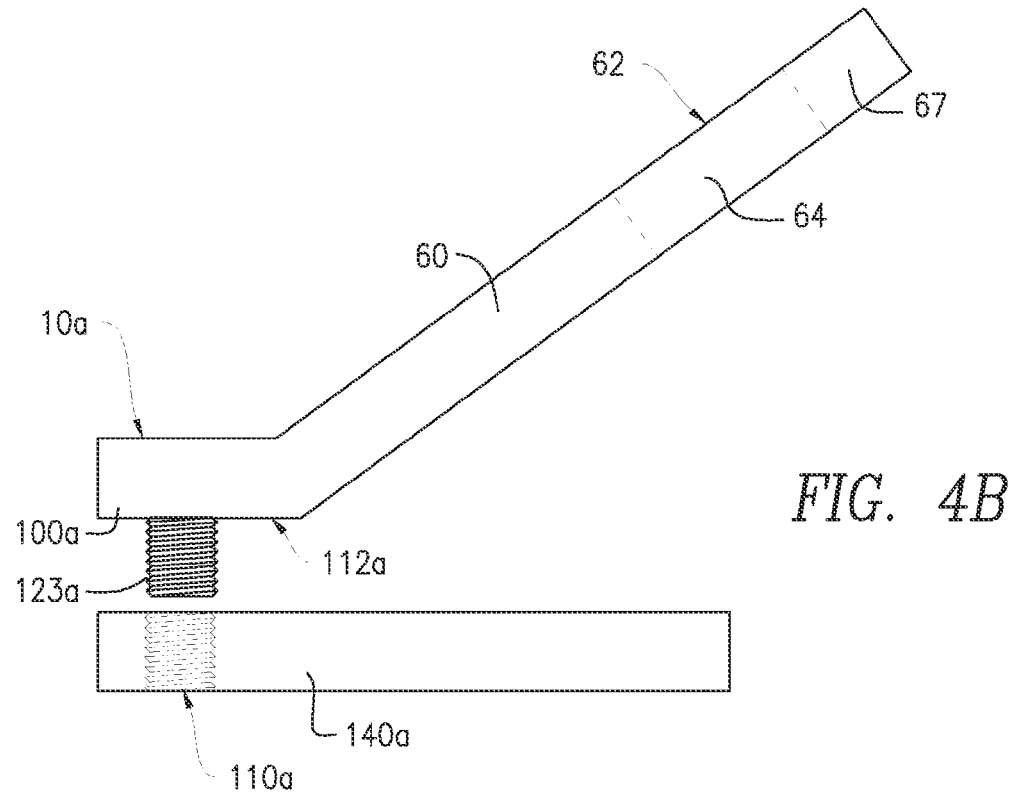
FIG. 4B is a side view of an alternative embodiment for a mount having a threaded member extending therefrom in accordance with one or more aspects of the instant application along with another structure having a threaded opening 110a therethrough.

As seen in the figures, base element 100 has extending therein an opening 110. Opening 110 preferably extends through a bottom surface 112 of base 100, but may be placed anywhere on base 100. Opening 110 (e.g., opening 110 of mount 10 of FIG. 4A) is preferably threaded to receive a correspondingly threaded member (see e.g., threaded extending member 123 of FIG. 4A) extending from some type of support structure (see e.g., support structure 140 of FIG. 4A). However, it is also to be understood that instead of having opening 110, a mount 10a (best seen in FIG. 4B) may include a base element 100a having a bottom surface 112a; the base element (e.g., the base element 100a of FIG. 4B) may have an outwardly extending member (see e.g., threaded extending member 123a of FIG. 4B) which would in turn be received into a cooperating opening 110a on a support structure (see e.g., support structure 140a of FIG. 4B). In this instance also it is preferred that the extending member and support opening both be threaded to allow for a more secure connection between the two. Additionally, other mounting constructions are intended to be encompassed in the invention, such as the use of a clamp from the support structure to securely hold base element 100, 100a, as are other constructions.

Figure 3:
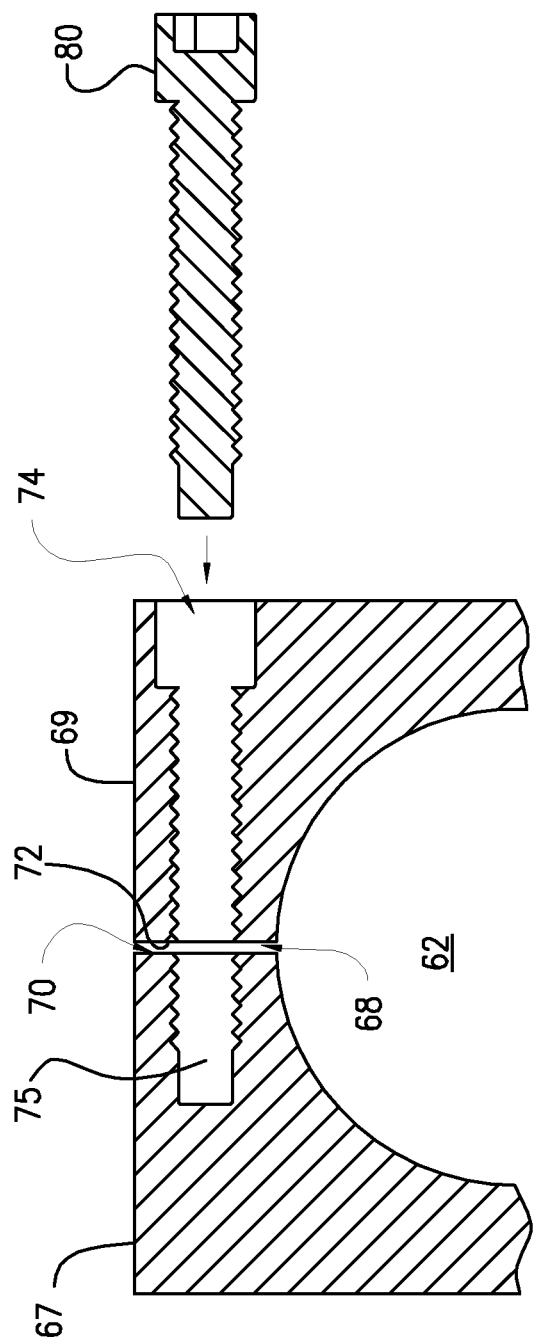
FIG. 3 is a cross-sectional view taken along line 3-3 of FIG. 1.

Turning now to a discussion of upper element 60 of mount 10, it is seen that in a preferred embodiment upper element 60 has an opening 62 extending therethrough. In the embodiment shown herein opening 62 is circular and such a circular opening is preferred, but not mandatory, it being anticipated by the invention herein that opening 62 may be any geometric shape. It is also seen that opening 62 of upper element 60 creates two arms 64 and 65, each having a respective head portion 67 and 69. Head portion 67 ends at end 70, while head portion 69 ends at end 72. Ends 70 and 72 do not touch and have a gap 68 extending therebetween. Through head 69 extends opening 74, through which screw/bolt/tightening mechanism 80 (hereinafter "element 80") is received. Opening 74 extends completely through head 69 and end 72 of head 69. As is best shown in FIG. 3, a corresponding and communicating opening 75 extends through end 70 of head 67, so that element 80 is able to be received therein. Assuming element 80 is threaded and that at least opening 75 is also threaded, then as element 80 is tightened into opening 75, ends 70 and 72 are drawn together. As ends 70 and 72 draw together, opening 62 of element 60 becomes smaller; i.e., the diameter lessens, thereby creating a clamping force against protruding member 90 of panel 30, discussed in more detail below. It is also to be understood herein that some, or all of, opening 74 may be correspondingly threaded to receive element 80.

To help secure element 80 within the opening in end 70, all of, or at least a portion of, opening 74 may also be correspondingly threaded. In the figures shown, element 80 is a threaded bolt having an Alan wrench opening in its head for tightening and loosening element 80, as is known in the art. Other elements 80 are anticipated herein; such as, but not limited to, screws and/or bolts having Philips or flat head openings. Other manners of tightening the clamping force of opening 62 by bringing ends 70 and 72 together are also anticipated herein, the primary inventive concept being the mounting of mount 10 through opening 62 onto protruding member 90. As way of a further example, another embodiment of the invention may involve no element 80 and no gap 68 between ends 70 and 72. Instead, opening 62 may be continuous and sized so that a little adhesive applied between the outer surface 92 of protruding member 90 allows opening 62 to be adhered to surface 92.

Turning now to a more detailed discussion of member 90, panel 30 may be formed such that member 90 is an integrally extending part of panel 30 or member 90 may be a separate member that is bonded to back surface 34 of panel 30. In the preferred embodiment, bonding refers to fusing or adhering member 90 to back surface 34 of panel 30. As seen in the figures, member 90 is circular and/or disk-shaped in cross section to conform to opening 62 of mount 10. However, as has been previously discussed, if opening 62 takes a different shape, member 90 would take the same shape. By way of example of at least one embodiment shown in FIGS. 1-2, the protruding member 90 may include a first surface 91 (e.g., on a first end of the protruding member 90) and a second surface 93 (e.g., on a second end of the protruding member 90). The protruding member 90 may include a third surface (e.g., the outer surface 92 of the protruding member) extending between the first and second surfaces 91, 93. The protruding member 90 may be substantially circular, circular, disk-shaped and/or substantially disk-shaped in cross section to conform to the opening 62 of the mount 10 when the opening 62 of the mount 10 is substantially circular, circular, disk-shaped and/or substantially disk-shaped. Because the protruding member 90 preferably is sized and shaped to conform to the opening 62, one surface (e.g., such as the first surface 91) may be either integral with the panel 30 or bonded, fused and/or adhered to the back surface 34 of the panel 30. The one surface (e.g., such as the first surface 91) and/or the protruding member 90 may be sized and shaped such that the protruding member 90 extends through the hole 62 so that the tightening mechanism (e.g., in at least one embodiment, the tightening mechanism may be the screw/bolt/tightening mechanism 80) may draw the ends 70, 72 of the heads 67, 69 together such that the opening 62 may be at least one of substantially on, in connection with and contracted around the protruding member 90. In at least one embodiment, the protruding member 90 may be cylindrical. The first surface 91 of the protruding member 90 may comprise at least one of: a surface bonded, fused and/or adhered to the back surface 34 of the panel 30; the back surface 34 of the panel 30 (e.g., by way of an adhesive, adhering material and/or adhering element, a bonding material or element; via an adhering material and/or element, adhesive, bonding material, etc. located between at least one portion of an optical structure, such as the panel 30, and at least one portion of the first surface 91 of the protruding member 90; etc.); a surface of the panel 30 when the member 90 is integrally formed with the panel 30; the top surface of a cylinder (e.g., when the protruding member 90 is cylindrical); and any other surface as discussed herein and/or known to those skilled in the art at the time the invention was filed that includes the structural attributes of the first surface 91 discussed herein. The second surface 93 of the protruding member 90 may comprise at least one of: a surface on the opposite side of the protruding member 90 from the first surface 91; a surface in contact with the third surface (e.g., the outer surface 92) of the protruding member 90 and spaced away from the panel 30 and/or the back surface 34 of the panel 30; the bottom surface of a cylinder (e.g., when the protruding member 90 is cylindrical); a surface of the cylinder that is inserted into and/or disposed within the opening 62; a surface of the protruding member 90 that is aligned with or substantially aligned with a surface of the arms 64, 65 (e.g., the surface of the arms 64, 65 that is on the opposite side of the upper element 60 of the mount 10 away from the panel 30); and any other surface as discussed herein and/or known to those skilled in the art at the time the invention was filed that includes the structural attributes of the second surface 93 discussed herein. In at least one embodiment where the protruding member 90 does not extend all the way through the opening 62 or where the second surface 93 of the protruding member 90 is aligned with or substantially aligned with a surface of the arms 64, 65 (see e.g., FIG. 2), the opening 62 may be disposed at least one of substantially on, in connection with and around at least one of a third surface (e.g., the outer surface 92 of the protruding member 90) and the second surface 93. Any of the first, second and third surfaces 91, 93, 92 of the protruding member 90 may be solid (see e.g., FIGS. 1-2). For example, when the protruding member 90 is cylindrical, the first, second and third surfaces 91, 93, 92 of the protruding member 90 may define a solid cylinder. The first and second surfaces 91, 93 of the protruding member 90 may be substantially parallel or parallel to each other.

The method of mounting optical structure 20 onto mount 10 is to form an optical structure having a reflective surface and a protruding member extending from a back surface of the optical structure, wherein the protruding member is either integrally formed from, or bonded to, the back surface of the optical structure. Forming a mounting member having a base element having a construction for allowing the mounting member to be mounted to another structure, the mounting member further having an upper element having a first opening extending therethrough, such first opening forming two arms each having a head portion and ending at ends thereof such that the ends are preferably separated by a gap therebetween at least when the mounting member is not attached to the optical structure. Sliding the first opening of the mounting member over the protruding member of the optical structure. Tightening the first opening of the mounting member around the protruding member by inserting a tightening mechanism into a second opening located through one of the head portions of the mounting member and by further inserting and tightening the tightening member into a third opening in the other head portion of the mounting member so that the tightening member draws the two ends of the head portions together thereby contracting the first opening of the mounting member around the protruding member of the optical structure. The tightening member preferably being a threaded bolt which is received into the third opening and the third opening also being threaded. As previously stated above, the second opening of the mounting member may also be threaded in whole or in part along its length.

Figure 1:
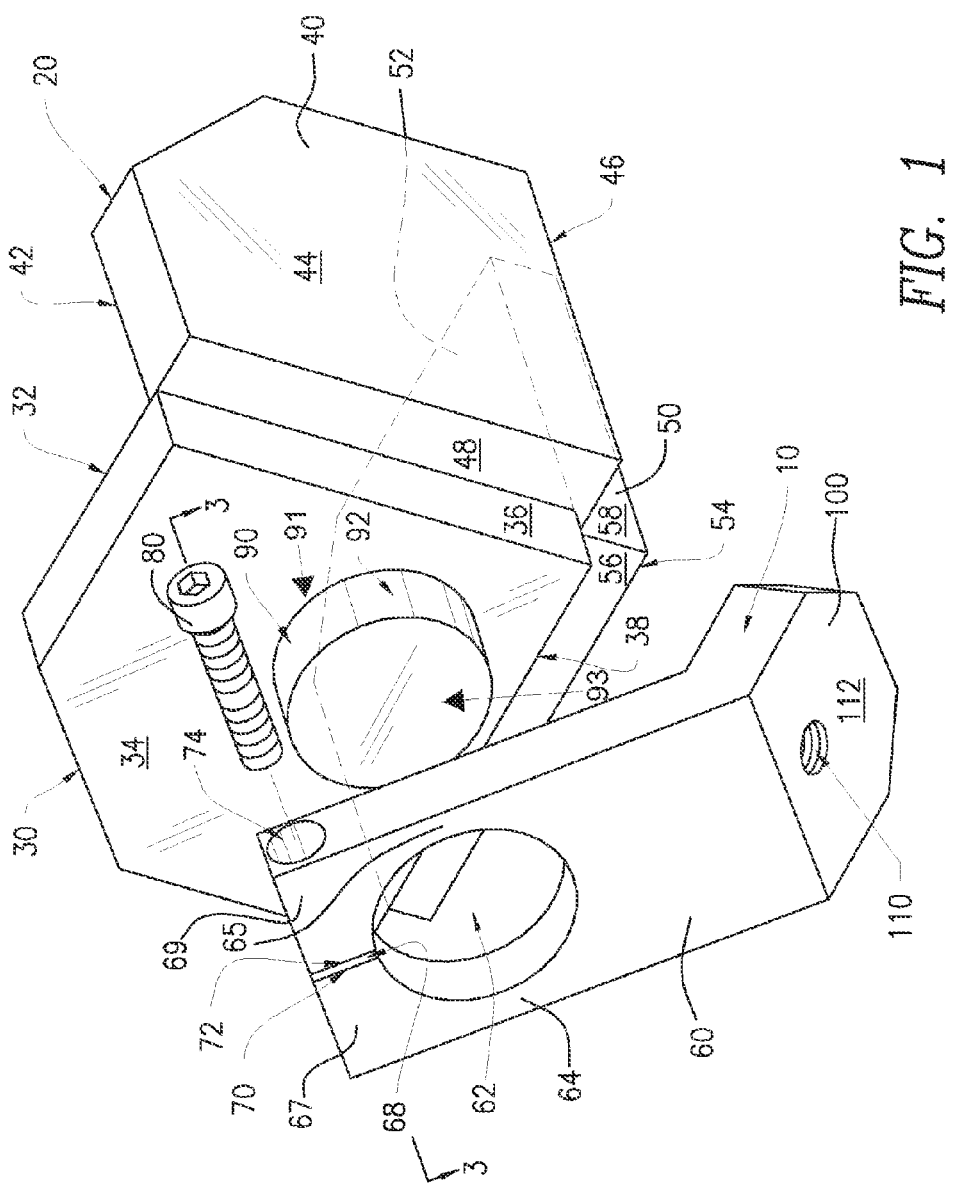
FIG. 1 is an exploded perspective view of a mount, optical structure and screw, made in accordance with the invention.
Figure 2:
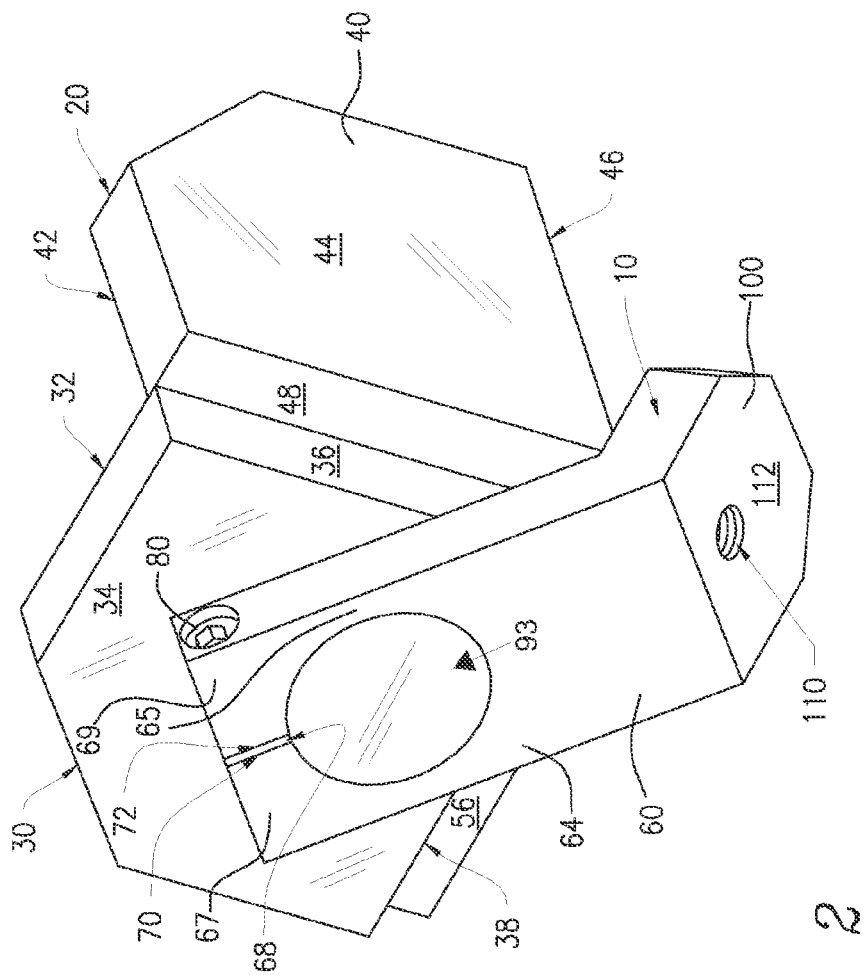
FIG. 2 is a perspective view of the structures of FIG. 1 as joined together.

The manner of mounting described herein is an improvement over prior mounting manners and is equally good, if not better, at preventing distortion of reflective surface 32 (and therefore of reflective surfaces 42 and 52) so as to help maintain reflective surfaces 32, 42 and 52 in their substantially flat and substantially perpendicular relationship to each other. In particular, with the manner of mounting described herein there are no distortional stresses applied on reflective surface 32 by either the securing forces exerted by the contracting of first opening 62 around protruding member 90 or due to contraction or expansion of the mounting member due to temperature change, or other reasons. For example, as best seen in FIGS. 1-2, the upper element 60 and/or the opening 62 of the upper element 60 may be disposed at least one of substantially on, in connection with and around at least one of the third surface (e.g., the outer surface 92) of the protruding member 90 and the second surface 93. In particular, due to the orientation of protruding member 90 to reflective surface 32 and further since any such contracting or distortional forces exerted on member 90 from the mounting member are applied in directions/planes that are parallel to reflective surface 32, and not perpendicular to it, such forces will only nominally, if at all, effect the optical flatness of surface 32.

It will also be seen that the manner of mounting described herein achieves substantial rigidity between optical structure 20 and mount 10. Further, as described in the immediate above paragraph, the preferred low coefficient of thermal expansion metal alloy material which makes up mount 10 significantly reduces the effects of thermal expansion/contraction of mount 10 so as to substantially minimize these effects on the accuracy of optical structure 20.

It will thus be seen that the objects set forth above, among those made apparent from the preceding description, are efficiently attained, and, since certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method of mounting an optical structure, comprising the steps of:

sliding a first opening extending through an upper element of a mount for mounting an optical structure over at least one portion of a protruding member, said optical structure comprising at least one reflective or mirror panel, said at least one reflective or mirror panel having at least one reflective surface and at least one back surface substantially opposite said reflective surface, and said protruding member extending from said at least one back surface of said optical structure and being part of said mount for mounting said optical structure such that at least one portion of said at least one back surface of said optical structure is at least one of disposed directly on and in direct connection with at least one portion of a first surface of said protruding member, or said at least one portion of said optical structure is at least one of bonded directly, fused directly and adhered directly to the at least one portion of said first surface of said protruding member such that only a bonding, fusing or adhering material or element is located between the at least one portion of said optical structure and the at least one portion of said first surface of said protruding member, and said first opening at least one of forms and defines two arms in said upper element, each of said two arms having a head portion and ending at an end thereof; and tightening said first opening of said upper element of said mount around said at least one portion of said protruding member such that at least one of one or more contracting forces and one or more distortional forces affecting at least one of said reflective surface and said back surface of said optical structure and an optical flatness of at least one of said reflective surface and said back surface of said optical structure are at least one of reduced and eliminated, thereby maintaining the optical flatness of said surface of said optical structure, by inserting a tightening mechanism into a second opening located through one of said head portions of said upper element and by further inserting and tightening said tightening mechanism into a third opening in said other head portion of said upper element so that said tightening mechanism draws said two ends of said head portions toward each other such that said upper element is disposed at least one of substantially on, in connection with and around at least one of at least one portion of a second surface and at least one portion of a third surface of said protruding member and said protruding member is disposed between at least a portion of said optical structure and at least a portion of said upper element of said mount.

2. The method of mounting an optical structure as recited in claim 1, further comprising the step of integrally forming said protruding member with said at least one reflective or mirror panel of said optical structure.

3. The method of mounting an optical structure as recited in claim 1, further comprising the step of bonding said protruding member to said back surface of said at least one reflective or mirror panel of said optical structure.

4. The method of mounting an optical structure as recited in claim 3, wherein said bonding comprises at least one of fusing and adhering.

5. The method of mounting an optical structure as recited in claim 1, further comprising the step of forming a base element of said mount with said upper element of said mount.

6. The method of mounting an optical structure as recited in claim 5, said base element being formed integrally with said upper element.

7. The method of mounting an optical structure as recited in claim 5, further comprising the step of forming supporting means for said base element of said mount for securing said optical structure to a support structure.

8. The method of mounting an optical structure as recited in claim 7, wherein said supporting means comprising a threaded member extending from said support structure for cooperative screwed attachment within a threaded opening in said base element.

9. The method of mounting an optical structure as recited in claim 7, wherein said supporting means comprising a threaded member extending from said base element for cooperative screwed attachment within a threaded opening in said support structure.

10. The method of mounting an optical structure as recited in claim 1, wherein said at least one reflective or mirror panel operates to at least one of: (i) change a direction of light; and (ii) retroreflect light.

11. The method of mounting an optical structure as recited in claim 1, wherein at least one of: (i) said third surface of said protruding member extends between said first and second surfaces thereof and said first surface of said protruding member is substantially parallel to said second surface of said protruding member; (ii) said protruding member is further disposed between said optical structure and at least a portion of a base element of said mount, the base element being at least one of connected to, disposed on and integral with said upper element of said mount; (iii) said upper element is disposed on, connected to or made integral with a base element; (iv) at least a portion of said protruding member is disposed on or in, or connected to, said upper element such that said protruding member extends between said upper element and said optical structure; (v) supporting means are formed or provided for a base element of said mount for securing said optical structure to a support structure; said supporting means comprising a threaded member extending from said support structure for cooperative screwed attachment within a threaded opening in said base element; or supporting means comprising a threaded member extending from said base element for cooperative screwed attachment within a threaded opening in said support structure.

12. The method of mounting an optical structure as recited in claim 1, wherein at least one of:
    (i) said protruding member comprises a solid cylinder, said first and second surfaces of said protruding member each extending continuously from one side of said protruding member to the other side such that said first and second surfaces are at least one of substantially circular, circular, substantially disk-shaped and disk-shaped;
    (ii) said first and second surfaces of said protruding member are substantially parallel to each other;
    (iii) said first and second surfaces of said protruding member are solid;
    (iv) said protruding member comprises a solid cylinder; and
    (v) said third surface of said protruding member is solid.

13. A method of mounting an optical structure, comprising the steps of:
    providing an optical structure comprising at least one reflective or mirror panel, said at least one reflective or mirror panel having at least one reflective surface and at least one back surface substantially opposite said reflective surface, wherein said back surface has a protruding member extending therefrom, said protruding member being part of a mount for mounting said optical structure such that at least one portion of said at least one back surface of said optical structure is at least one of disposed directly on and in direct connection with at least one portion of a first surface of said protruding member, or said at least one portion of said optical structure is at least one of bonded directly, fused directly and adhered directly to the at least one portion of said first surface of said protruding member such that only a bonding, fusing or adhering material or element is located between the at least one portion of said optical structure and the at least one portion of said first surface of said protruding member;
    providing an upper element of said mount comprising a first opening extending therethrough, said first opening at least one of forming and defining two arms in said upper element, each of said two arms having a head portion and ending at an end thereof;
    sliding said first opening of said mount over at least one portion of said protruding member; and
    tightening said first opening of said upper element of said mount around said at least one portion of said protruding member such that at least one of one or more contracting and one or more distortional forces affecting at least one of said reflective surface and said back surface of said optical structure and an optical flatness of at least one of said reflective surface and said back surface of said optical structure are at least one of reduced and eliminated, thereby maintaining the optical flatness of said surface of said optical structure, by inserting a tightening mechanism into a second opening located through one of said head portions of said upper element and by further inserting and tightening said tightening mechanism into a third opening in said other head portion of said upper element so that said tightening mechanism draws said two ends of said head portions toward each other such that said upper element is disposed at least one of substantially on, in connection with and around at least one of at least one portion of a second surface and at least one portion of a third surface of said protruding member and said protruding member is disposed between at least a portion of said optical structure and at least a portion of said upper element of said mount.

14. The method of mounting an optical structure as recited in claim 13, further comprising: (i) the step of integrally forming said protruding member with said at least one reflective or mirror panel of said optical structure; or (ii) the step of bonding said protruding member to said back surface of said at least one reflective or mirror panel of said optical structure.

15. The method of mounting an optical structure as recited in claim 14, wherein said bonding comprises at least one of fusing and adhering.

16. The method of mounting an optical structure as recited in claim 13, further comprising at least one of:
    the step of forming a base element of said mount with said upper element of said mount; and
    the step of forming supporting means for a base element of said mount for securing said optical structure to a support structure.

17. The method of mounting an optical structure as recited in claim 16, wherein at least one of: (i) said base element being formed integrally with said upper element; and (ii) said supporting means comprising a threaded member extending from said support structure for cooperative screwed attachment within a threaded opening in said base element or said supporting means comprising a threaded member extending from said base element for cooperative screwed attachment within a threaded opening in said support structure.

18. The method of mounting an optical structure as recited in claim 13, wherein said at least one reflective or mirror panel operates to at least one of: (i) change a direction of light; and (ii) retroreflect light.

19. The method of mounting an optical structure as recited in claim 13, wherein at least one of: (i) said third surface of said protruding member extends between said first and second surfaces thereof and said first surface of said protruding member is substantially parallel to said second surface of said protruding member; (ii) said protruding member is further disposed between said optical structure and at least a portion of a base element of said mount, the base element being at least one of connected to, disposed on and integral with said upper element of said mount; (iii) said upper element is disposed on, connected directly to or made integral with a base element; (iv) at least a portion of said protruding member is disposed on or in, or connected to, said upper element such that said protruding member extends between said upper element and said optical structure; (v) supporting means are formed or provided for a base element of said mount for securing said optical structure to a support structure; said supporting means comprising a threaded member extending from said support structure for cooperative screwed attachment within a threaded opening in said base element; or supporting means comprising a threaded member extending from said base element for cooperative screwed attachment within a threaded opening in said support structure.

20. The method of mounting an optical structure as recited in claim 13, wherein at least one of:
(i) said protruding member comprises a solid cylinder, said first and second surfaces of said protruding member each extending continuously from one side of said protruding member to the other side such that said first and second surfaces are at least one of substantially circular, circular, substantially disk-shaped and disk-shaped;
(ii) said first and second surfaces of said protruding member are substantially parallel to each other;
(iii) said first and second surfaces of said protruding member are solid;
(iv) said protruding member comprises a solid cylinder; and
(v) said third surface of said protruding member is solid.

* * * * *